United States Patent [19]

Robello et al.

[11] Patent Number: 5,075,043

[45] Date of Patent: Dec. 24, 1991

[54] OPTICAL ARTICLE CONTAINING A LINEAR CONDENSATION POLYMER EXHIBITING A HIGH LEVEL OF SECOND ORDER POLARIZATION SUSCEPTIBILITY

[75] Inventors: Douglas R. Robello, Webster; Craig S. Willand, Rochester; David J. Williams, Fairport, all of N.Y.

[73] Assignee: Eastman Kodak Company, Rochester, N.Y.

[21] Appl. No.: 402,725

[22] Filed: Sep. 5, 1989

Related U.S. Application Data

[63] Continuation-in-part of Ser. No. 274,178, Nov. 21, 1988, abandoned.

[51] Int. Cl.$^5$ .......................... F21V 9/00; F21V 9/04; G02B 6/00; G02B 6/10
[52] U.S. Cl. .................... 252/582; 252/589; 385/141; 385/8
[58] Field of Search .................. 252/582, 589, 586; 350/96.12, 96.14, 96.34

[56] References Cited

U.S. PATENT DOCUMENTS

| | | | |
|---|---|---|---|
| 4,694,066 | 9/1987 | DeMartino et al. | 528/373 |
| 4,749,774 | 6/1988 | Weaver et al. | 528/290 |
| 4,792,208 | 12/1988 | Ulman et al. | 350/96.34 |
| 4,796,971 | 1/1989 | Robello et al. | 350/96.34 |
| 4,886,339 | 12/1989 | Scozzafava et al. | 350/96.34 |
| 4,900,127 | 2/1990 | Robello et al. | 350/96.34 |

OTHER PUBLICATIONS

Le Barny, Ravaux, Dubois, Parneix, Njeumo, Legamd, and Levelut, "Some New Side-Chain Liquid Crystalline Polymers for Non-Linear Optics", pp. 56–64 of SPIE, vol. 682, Molecular and Polymeric Optoelectronic Materials: Fundamentals and Applications (1986).

Griffin, Bhatti, and Hung, "Synthesis of Sidechain Liquid Crystal Polymers for Nonlinear Optics", pp. 65–69 of SPIE, vol, 682, Molecular and Polymeric Optoelectronic Materials: Fundamentals and Applications (1986).

D. J. Williams, "Organic Polymeric and Non-Polymeric Materials with Large Optical Nonlinearities", Angew. Chem. Int. Ed. Engl.23 (1984).

Zyss, "Nonlinear Organic Materials for Integrated Optics", Journal of Molecular Electronics, vol. 1, pp. 25–45, 1985.

S. Matsumoto, K. Kubodera, T. Kurihara, & T. Kaino, "Nonlinear Optical Properties of an Azo Dye Attached Polymer", App. Phys. Lett., vol. 51, No. 6, Jul. 1987, pp. 1 and 2.

G. D. Green, H. K. Hall, J. E. Mulvaney, J. Noonan and D. J. Williams "Donor–Acceptor–Containing Quinodimethanes. Synthesis of Polyesters Containing a Nonrandomly Placed Highly Polar Repeat Unit", Macromolecules 1987, 20, 722–726.

Primary Examiner—Robert L. Stoll
Assistant Examiner—Philip Tucker
Attorney, Agent, or Firm—Carl O. Thomas

[57] ABSTRACT

An optical article is disclosed containing, for the transmission of electromagnetic radiation, a medium exhibiting a second order polarization susceptibility greater than $10^{-9}$ electrostatic units comprised of a linear polymer containing polar aligned noncentrosymmetric molecular dipoles having an electron donor moiety linked through a conjugated $\pi$ bonding system to an electron acceptor moiety to permit oscillation of the molecular dipole between a ground state exhibiting a first dipole moment and an excited state exhibiting a differing dipole moment. The linear polymer is a condensation polymer including in its backbone a plurality of molecular dipoles including sulfonyl electron acceptor moieties sequentially arranged to reinforce electron displacement along the polymer backbone.

17 Claims, 2 Drawing Sheets

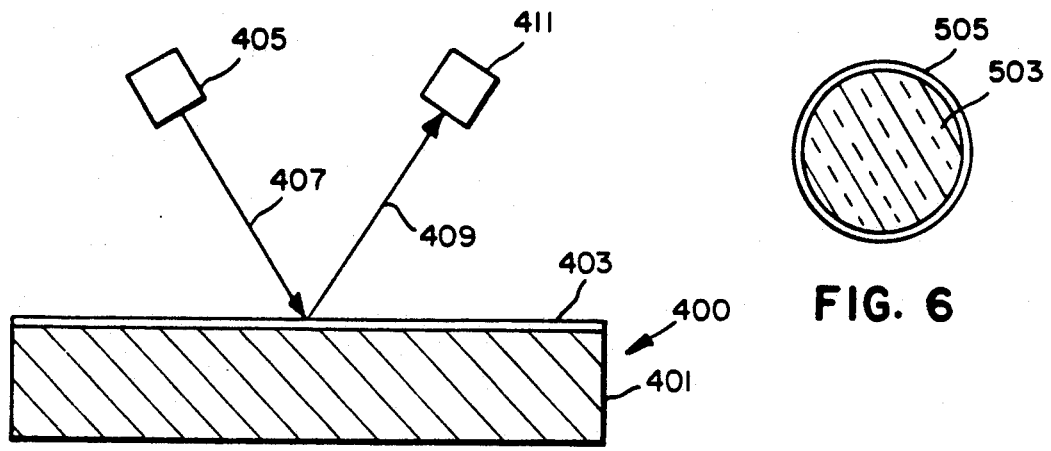
FIG. 4
FIG. 6
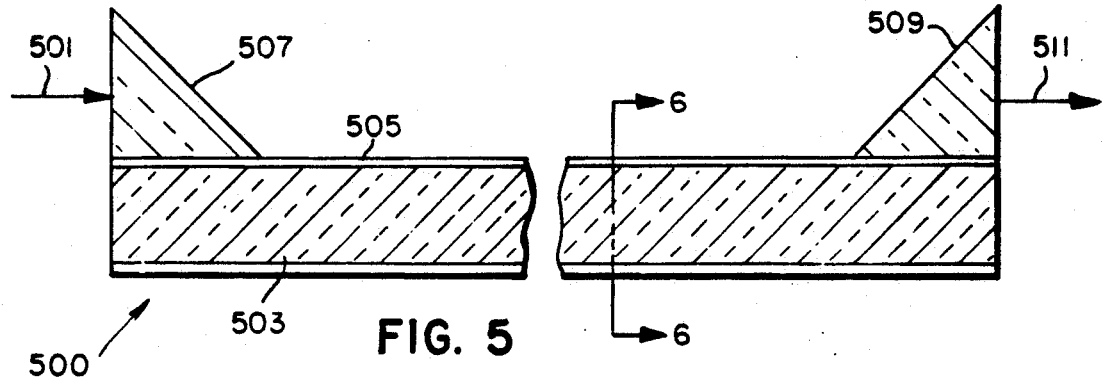
FIG. 5
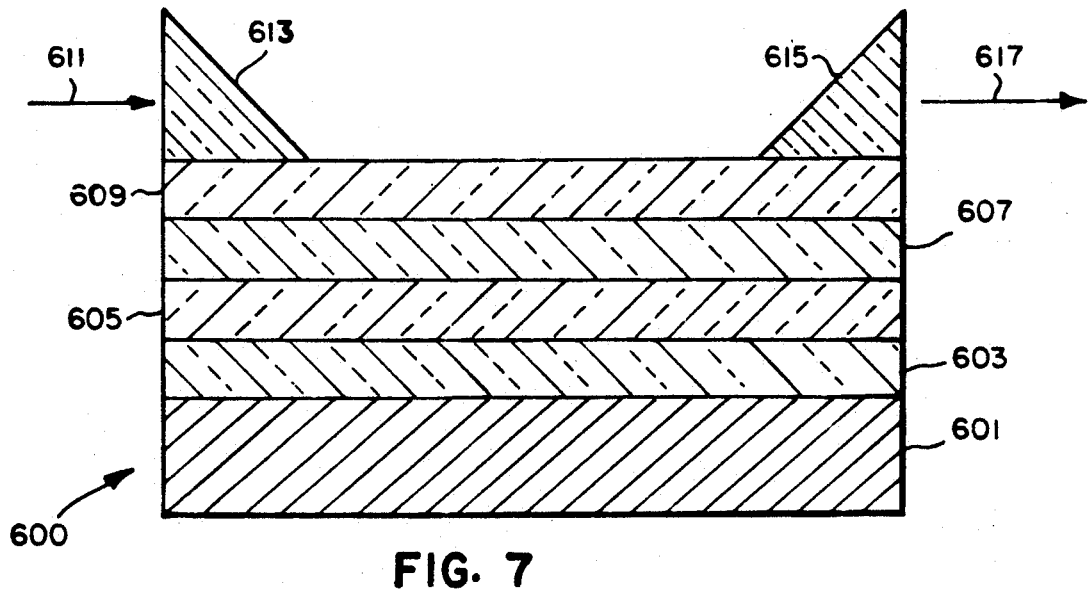
FIG. 7

OPTICAL ARTICLE CONTAINING A LINEAR CONDENSATION POLYMER EXHIBITING A HIGH LEVEL OF SECOND ORDER POLARIZATION SUSCEPTIBILITY

This is a continuation-in-part of U.S. Ser. No. 274,178, filed Nov. 21, 1988, now abandoned.

FIELD OF THE INVENTION

The invention relates to optical articles, particularly articles which exhibit effects attributable to the polarization of electromagnetic radiation. The invention relates specifically to optical articles which exhibit effects attributable to the nonlinear polarization of electromagnetic radiation.

BACKGROUND OF THE INVENTION

The significant polarization components of a medium produced by contact with an electric field are first order polarization (linear polarization), second order polarization (first nonlinear polarization), and third order polarization (second nonlinear polarization). On a molecular level this can be expressed by Equation 1:

$$P = \alpha E + \beta E^2 + \gamma E^3 \qquad (1)$$

where
P is the total induced polarization,
E is the local electric field created by electromagnetic radiation, and
$\alpha$, $\beta$, and $\gamma$ are the first, second, and third order polarizabilities, each of which is a function of molecular properties.

$\beta$ and $\gamma$ are also referred to as first and second hyperpolarizabilities, respectively. The molecular level terms of Equation 1 are first order or linear polarization $\alpha E$, second order or first nonlinear polarization $\beta E^2$, and third order or second nonlinear polarization $\gamma E^3$.

On a macromolecular level corresponding relationships can be expressed by Equation 2:

$$P = \chi^{(1)} E + \chi^{(2)} E^2 + \chi^{(3)} E^3 \qquad (2)$$

where
P is the total induced polarization,
E is the local electric field created by electromagnetic radiation, and
$\chi^{(1)}$, $\chi^{(2)}$, and $\chi^{(3)}$ are the first, second, and third order polarization susceptibilities of the electromagnetic wave transmission medium. $\chi^{(2)}$ and $\chi^{(3)}$ are also referred to as the first and second nonlinear polarization susceptibilities, respectively, of the transmission medium. The macromolecular level terms of Equation 2 are first order or linear polarization $\chi E$, second order or first nonlinear polarization $\chi^{(2)} E^2$, and third order or second nonlinear polarization $\chi^{(3)} E^3$.

Second order polarization ($\chi^{(2)} E^2$) has been suggested to be useful for a variety of purposes, including optical rectification (converting electromagnetic radiation input into a DC output), generating an electro-optical (Pockels) effect (using combined electromagnetic radiation and DC inputs to alter during their application the refractive index of the medium), phase alteration of electromagnetic radiation, and parametric effects, most notably frequency doubling, also referred to as second harmonic generation (SHG).

To achieve on a macromolecular level second order polarization ($\chi^{(2)} E^2$) of any significant magnitude, it is essential that the transmission medium exhibit second order (first nonlinear) polarization susceptibilities, $\chi^{(2)}$, greater than $10^{-9}$ electrostatic units (esu). To realize such values of $\chi^{(2)}$ it is necessary that the first hyperpolarizability $\beta$ be greater than $10^{-30}$ esu. For a molecule to exhibit values of $\beta$ greater than zero, it is necessary that the molecule be asymmetrical about its center—that is, noncentrosymmetric. Further, the molecule must be capable of oscillating (i.e., resonating) between an excited state and a ground state differing in polarity. It has been observed experimentally and explained by theory that large $\beta$ values are the result of large differences between ground and excited state dipole moments as well as large oscillator strengths (i.e., large charge transfer resonance efficiencies).

For $\chi^{(2)}$ to exhibit a usefully large value it is not only necessary that $\beta$ be large, but, in addition, the molecular dipoles must be aligned so as to lack inversion symmetry. The largest values of $\chi^{(2)}$ are realized when the molecular dipoles are arranged in polar alignment—e.g., the alignment obtained when molecular dipoles are allowed to align themselves in an electric field.

D. J. Williams, "Organic Polymeric and Non-Polymeric Materials with Large Optical Non-linearities", Angew. Chem. Int. Ed. Engl. 23 (1984) 690–703, postulates mathematically and experimentally corroborates achievement of second order polarization susceptibilities $\chi^{(2)}$ using organic molecular dipoles equaling and exceeding those of conventional inorganic noncentrosymmetric dipole crystals, such a lithium niobate and potassium dihydrogen phosphate. To obtain the polar alignment of the organic molecular dipoles necessary to large values of $\chi^{(2)}$ Williams dispersed small amounts of the organic molecular dipoles as guest molecules in host liquid crystalline polymers. Upon heating the host polymers above their glass transition temperatures, poling in an externally applied electric field to produce the desired polar alignment of the molecular dipoles, and then cooling with the field applied, organic films with the measured levels of $\chi^{(2)}$ were obtained.

Zyss "Nonlinear Organic Materials for Integrated Optics", Journal of Molecular Electronics, Vol. 1, pp. 25–45, 1985, though generally cumulative with Williams, provides a review of passive linear light guide construction techniques and elaborates on LB film construction techniques including radiation patterning, showing in FIG. 8 an LB film construction converted into a linear polymer.

Recently attempts have been reported to prepare linear polymers containing pendant groups capable of acting as molecular dipoles for enhancing second order polarization effects. These attempts are illustrated by the following papers, all published in SPIE, Vol. 682, Molecular and Polymeric Optoelectronic Materials: Fundamentals and Applications (1986):

Le Barny, Ravaux, Dubois, Parneix, Njeumo, Legarnd, and Levelut, "Some New Side-Chain Liquid Crystalline Polymers for Non-Linear Optics", pp. 56–64, discloses unsuccessful attempts to obtain liquid crystal properties in vinyl addition copolymers containing aminostilbene pendant groups in concentrations of 2.6 percent.

Griffin, Bhatti, and Hung, "Synthesis of Sidechain Liquid Crystal Polymers for Nonlinear Optics", pp. 65–69, reports polyester copolymers containing stilbene molecular dipoles linked to the polymer backbone through an oxy electron donating moiety.

DeMartino et al U.S. Pat. No. 4,694,066 discloses a thermotropic liquid crystalline polymer which is characterized by a recurring monomeric unit of the formula:

   (3)

where
P is a polymer main chain unit,
S is a flexible spacer, and
M is a pendant mesogen which exhibits a second order nonlinear optical susceptibility $\beta$ of at least about $20 \times 10^{-30}$ esu under stated conditions of measurement. In one form the mesogen satisfies the formula:

   (4)

where
X is —NR— or —S—;
Y can take various stilbenoid forms; and
Z is an electron donating or withdrawing group, the latter including nitro, haloalkyl, acyl, alkanoyloxy, alkoxysulfonyl, and the like.

S. Matsumoto, K. Kubodera, T. Kurihara, and T. Kaino, "Nonlinear Optical Properties of an Azo Dye Attached Polymer", App. Phys. Lett., Vol. 51, No. 6, July 1987, pp. 1 and 2, discloses the synthesis of copolymers of azo dye disubstituted acrylic monomer and methyl methacrylate.

G. D. Green, H. K. Hall, J. E. Mulvaney, J. Noonan, and D. J. Williams, "Donor-Acceptor-Containing Quinodimethanes. Synthesis and Copolyesterification of Highly Dipolar Quinodimethanes", *Macromolecules*, 20, 716–722 (1987) and G. D. Green, J. I. Weinschenk, J. E. Mulvaney, and H. K. Hall, "Synthesis of Polyesters Containing a Nonrandomly Placed Highly Polar Repeat Unit", *Macromolecules*, 20, 722–726 (1987), each disclose linear condensation polymers containing molecular dipole repeating units in the polymer backbone. Sulfonyl electron acceptors are not disclosed.

Related Patent Applications

Optical articles containing polar aligned organic molecular dipoles which form repeating units in a crosslinked polymeric matrix are the subject matter of Robello et al U.S. Pat. No. 4,796,971.

Optical articles containing molecular dipoles held in polar alignment by a crosslinked polymeric binder are the subject matter of the allowed application of Scozzafava et al, "AN OPTICAL ARTICLE CONTAINING A TRANSMISSION MEDIUM EXHIBITING A HIGH LEVEL OF SECOND ORDER POLARIZATION SUSCEPTIBILITY", Ser. No. 101,897, filed Sept. 28, 1987, commonly assigned, now U.S. Pat. No. 4,886,339.

Optical articles containing a polar aligned organic molecular dipole containing a sulfonyl moiety as an electron acceptor are the specific subject matter of Ulman et al U.S. Pat. No. 4,792,208.

Optical articles containing polar aligned organic molecular dipoles as pendant groups of linear polymer repeating units are the subject of Robello et al, "An Optical Article Containing a Linear Polymer Exhibiting a High Level of Second Order Polarization Susceptibility", Ser. No. 241,740, (now U.S. Pat. No. 4,900,127) filed Sept. 8, 1988, as a continuation-in-part of Ser. Nos. 101,884 (now abandoned) and 101,888 (now U.S. Pat. No. 4,792,208), filed Sept. 28, 1987, both commonly assigned.

SUMMARY OF THE INVENTION

In one aspect the present invention is directed to an optical article containing, for the transmission of electromagnetic radiation, a medium exhibiting a second order polarization susceptibility greater than $10^{-9}$ electrostatic units comprised of a linear polymer containing polar aligned noncentrosymmetric molecular dipoles having an electron donor moiety linked through a conjugated $\pi$ bonding system to an electron acceptor moiety to permit oscillation of the molecular dipole between a ground state exhibiting a first dipole moment and an excited state exhibiting a differing dipole moment.

The invention is characterized in that the linear polymer is a condensation polymer including in its backbone a plurality of molecular dipoles the electron acceptor moieties of which are sulfonyl electron acceptor moieties, the molecular dipoles being relatively oriented to reinforce electron displacement along the polymer backbone.

The present invention constitutes a departure from the prior state of the art. By forming linear polymers with a plurality of molecular dipoles arranged to reinforced electron displacement along the polymer backbone optical articles can be produced having increased second order polarization susceptibilities as compared to corresponding optical articles employing linear polymers which contain molecular dipoles in pendant groups. This has in part been made possible by the availability of efficient electron acceptor moieties capable of being functionally substituted, specifically sulfonyl electron acceptor moieties. For example, none of the efficient electron acceptor moieties, such as cyano or nitro moieties, can be chemically substituted without destroying their essential electronic properties. On the other hand, the sulfonyl moiety requires by definition a hydrocarbon substituent, which can in turn permit further functional substitution. This has also in part been made possible by recognizing that by forming molecular dipole monomers so that a functional group associated with the electron donor moiety is capable of condensing selectively with an interactive functional group associated with the sulfonyl electron acceptor moiety repeating sequences of molecular dipoles can be formed which reinforce electron displacement along the backbone of the linear condensation polymer. When these capabilities are combined with polymer poling, a medium of enhanced second order polarization susceptibility results.

There are, of course, other advantages. By incorporating the molecular dipole in a polymer a variety of problems (e.g., limited solubilities and phase separation) that arise from attempts to disperse or dissolve molecular dipoles in separate polymeric binders are entirely avoided. Additionally, the sulfonyl electron acceptor moiety offers much greater freedom for controlling the physical properties of the high second order polarization susceptibility medium of the optical article. The substitution of sulfonyl electron acceptor moieties for conventional electron acceptor moieties can extend optical utility to different wavelength regions of the spectrum by being more transparent to input electromagnetic radiation, output radiation—e.g., second harmonic radiation, or a combination of both. The sulfonyl containing dipoles offer a broader range of solvent and binder compatibilities for achieving the required polar alignments for useful effects produced by second order polarization in optical articles. Sulfonyl substitution to achieve optimized physical compatibility with other materials encountered in optical article fabrication is readily achieved.

BRIEF DESCRIPTION OF THE DRAWINGS

FIG. 4 is an alternative form of a second harmonic generating optical article.

FIG. 5 is an optical article for achieving parametric effects.

FIG. 6 is a section taken along section line 6—6 in FIG. 5.

FIG. 7 is an optical article for achieving parametric effects and phase shifting.

DESCRIPTION OF PREFERRED EMBODIMENTS

Figure 1:
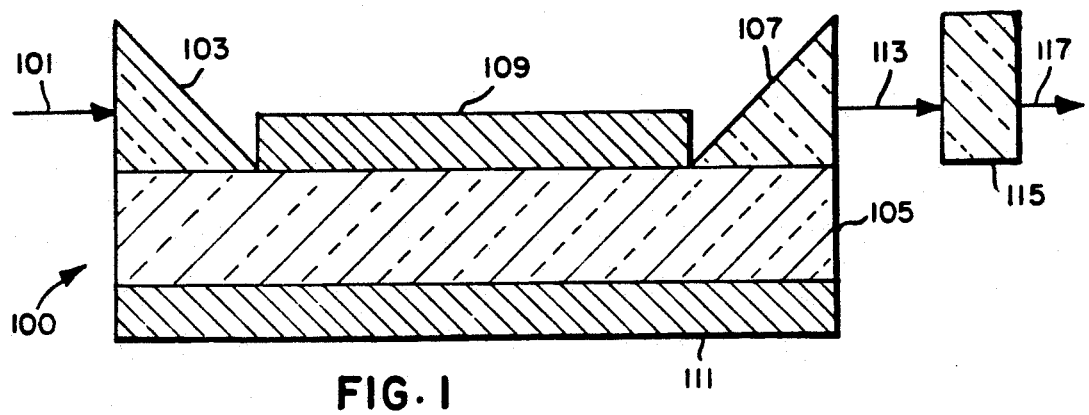
FIG. 1 is a second harmonic generating optical article.

The following are illustrative of optical articles satisfying the invention exhibiting effects attributable to second order polarization:

Referring to FIG. 1, the optical article 100 is capable of generating a second harmonic of electromagnetic radiation 101 supplied to it. Incoming electromagnetic radiation is introduced through input means 103, shown as a first prism, into an optically active transmission medium 105 which exhibits a high level ($>10^{-9}$ esu) second order or first nonlinear polarization susceptibility, hereinafter referred to simply as the optically active transmission medium according to the invention or, more succinctly, as the optically active transmission medium. Electromagnetic radiation is transmitted through the medium 105 to output means 107, shown as a second prism. In the simplest form of the optical article neither the input nor output prisms are required. Escape of electromagnetic radiation from the transmission medium can be minimized by locating optional guiding elements 109 and 111 above and below the transmission medium. The guiding elements can minimize radiation loss by being chosen to exhibit a lower refractive index than the transmission medium. Additionally or alternatively, the guiding elements can be chosen to be reflective to the electromagnetic radiation.

When the transmission medium is constructed according to the requirements of the invention, specifically described below, at least a portion of the electromagnetic radiation entering the transmission medium will be altered in frequency during its travel through the medium. More specifically, a second harmonic of the frequency will be generated. The electromagnetic radiation leaving the output means, indicated by arrow 113, exhibits both the original frequency of the input radiation and a second harmonic of this frequency. The electromagnetic radiation retaining the original frequency can, if desired, be removed by passing the electromagnetic radiation leaving the article through a filter 115 capable of absorbing radiation of the original frequency while transmitting higher frequency (shorter wavelength) portions of the electromagnetic radiation. By employing one or a combination of filters any broad or narrow frequency band of electromagnetic radiation can be retained in the transmitted output electromagnetic radiation 117.

Figure 2:
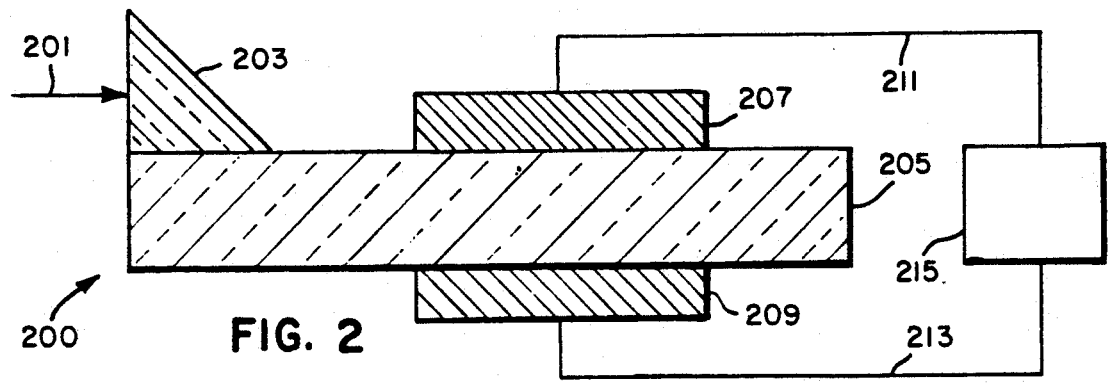
FIG. 2 is a DC signal providing optical article.

Referring to FIG. 2, an optical article 200 is shown capable of producing a DC potential when electromagnetic radiation 201 is supplied through input means 203, shown as a prism, to optically active transmission medium 205, which can be identical to medium 105, described above. When electromagnetic radiation is being transmitted through the medium a potential difference is produced between upper electrode 207 and lower electrode 209 in electrical contact with the upper and lower surfaces of the transmission medium. Electrical conductors 211 and 213 can be used to relay the potential of the upper and lower electrodes to an electronic response unit 215. The electronic response unit can in its simplest form be a unit that provides a digital response indicative of the the presence or absence of electromagnetic radiation in the transmission medium. Alternatively, the electronic response unit can provide an analog response indicative not only of the presence, but also the intensity or wavelength of electromagnetic radiation in the transmission medium.

Figure 3:
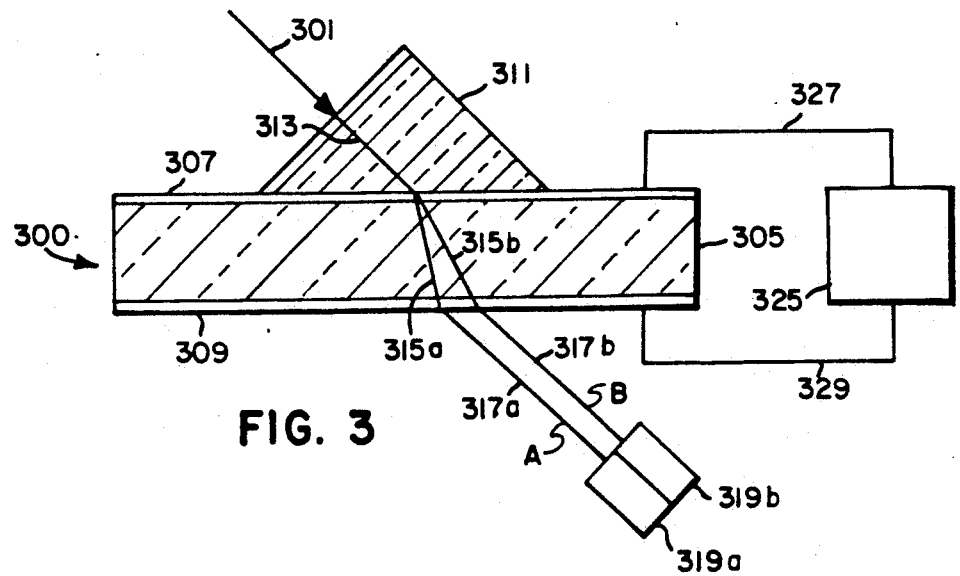
FIG. 3 is an electromagnetic beam displacement optical article.

Referring to FIG. 3, the optical article 300 is capable of physically displacing a beam 301 of electromagnetic radiation being transmitted through it as a function of the concurrent receipt of a DC bias. Optically active transmission medium 305, which can be identical to optically active medium 105 or 205, is provided with transparent upper and lower electrodes 307 and 309. The electrodes can, for example, be thin layers of a vacuum vapor deposited metal or metal oxide—e.g., indium tin oxide. An electromagnetic radiation input means, shown as prism 311, is located on the upper transparent electrode. The electromagnetic radiation passes through the prism as indicated by arrow 313. When the electromagnetic radiation enters the transmission medium, it follows either path 315a or path 315b. Depending upon which of the two alternative paths are followed, the first electromagnetic radiation either travels along path 317a or 317b upon emerging from the lower transparent electrode. The paths 315a and 317a together constitute an A path through the optical article while the paths 315b and 317b together constitute a B path through the optical article. Sensing units 319a and 319b are located to receive electromagnetic radiation traveling along the A and B paths, respectively. It is apparent that only one of the two sensing units is essential, since failure to sense electromagnetic radiation can be employed to indicate that the electromagnetic radiation has shifted to the alternate path.

Shifting of electromagnetic radiation between the A and B paths is achieved by supplying a DC bias to the upper and lower electrodes while transmission of the electromagnetic radiation through the optically active transmission medium is occurring. To accomplish the required DC bias a DC potential source is shown connected to the upper and lower electrodes by electrical conductors 327 and 329.

Application of the DC bias alters the refractive index of the transmission medium when it is formed of a material exhibiting a significant second order susceptibility. This causes the first electromagnetic radiation beam to be refracted at a different angle when the transmission medium is electrically biased, and this changes the first electromagnetic radiation path through the transmission medium. In some instances the refractive index of the transmission medium is increased by the electrical bias and in other instances lowered by the electrical bias, depending upon whether the molecular dipole contained within the transmission medium exhibits a positive or negative first hyperpolarizability $\beta$.

In FIG. 4 an optical article 400 is shown comprised of a reflective substrate 401 and an optically active transmission medium 403 according to the invention shown in the form of a layer. Electromagnetic radiation is supplied from a source 405 as indicated by arrow 407. The electromagnetic radiation traverses the optically active transmission medium, is reflected by the substrate, and traverses the optically active transmission medium a second time. Electromagnetic radiation leaving the optically active transmission medium is indicated by arrow 409. A sensor 411 which is responsive to the second harmonic of the input electromagnetic radiation, but not radiation at the wavelength of the input radiation, is shown provided to receive electromagnetic radiation from the layer 403. Instead of employing a sensor that is selectively responsive to the second harmonic wavelength, a sensor with a broader frequency band of response can be employed in combination with one or more filter elements, as described above in connection with FIG. 1. The thinner the layer of the optically active transmission medium, the higher the intensity of the input electromagnetic radiation must be in order to achieve a given output of second harmonic radiation. In the limiting case the optically active transmission medium can be a monomolecular oriented molecular dipole layer.

In FIGS. 5 and 6 an optical article 500 according to the invention is shown capable of inducing parametric effects, such as second harmonic generation, by acting on input electromagnetic radiation, indicated by arrow 501. To achieve alteration of the input radiation a transparent optical waveguide 503 of any conventional type is provided having on its external surface a layer of an optically active transmission medium 505 according to the invention, which can have the same properties as the medium 105, described above. The medium waveguide 503 is normally optically passive-that is, exhibits no significant levels of nonlinear (second or third order) polarization.

Means 507, shown as a prism, is provided to introduce the input electromagnetic radiation into the waveguide. Means 509, shown as a prism, is provided to retrieve electromagnetic radiation from the waveguide. Although the optically active transmission medium is shown interposed between the input and output prisms, it is appreciated that an interposed layer is not required in these locations.

As the input electromagnetic radiation traverses the waveguide, a portion of the radiation will impinge on the surrounding layer of the optically active transmission medium and be refracted back into the waveguide. To avoid escape of electromagnetic radiation a reflective layer, not shown, can be coated over the optically active transmission medium. Successive impingements of transmitted radiation on the optically active medium result in measurable parametric effects, such as second harmonic generation.

In FIG. 7 an optical article 600 is shown capable of producing useful parametric effects similarly as optical article 500, but exhibiting a greater capability for better phase matching, such as that desired for improved efficiency second harmonic generation. A substrate 601 is shown supporting superimposed waveguide layers 603, 605, 607, and 609. While four superimposed layers are shown, in practice any odd or even number of superimposed layers can be provided. The odd layers (603 and 607) in the sequence can be formed of an optically active transmission medium according to the invention (similarly as medium 105) while the even layers (605 and 609) can be formed of a passive or linear optical medium, as described above. Alternatively, the optically active and passive transmission media layers can be reversed in order.

To achieve useful parametric effects, electromagnetic radiation, indicated by arrow 611 is supplied to the waveguiding layers through input means 613, shown as a prism. In passing through the waveguiding layers to output means 615, shown as a prism, the optically active and passive media layers together alter the form of the electromagnetic radiation, indicated by output arrow 617, so that parametric (e.g., second harmonic) effects are more efficiently generated.

The optical article constructions described above are exemplary of a large variety of possible differing optical article constructions. The present invention is compatible with any conventional construction of an optical article relying on a significant second order polarization susceptibility to produce a useful effect. For example, whereas in connection with FIG. 5 an optical article is disclosed in which the optically active transmission medium surrounds a substrate, which can have linear optical properties, Zyss, cited above, in FIG. 2(d) discloses just the converse arrangement, in which the optically active transmission medium forms a core clad with a shell of a linear optical transmission medium. Zyss also discloses an arrangement in which the optically active transmission medium is located in a groove on the surface of a linear optical transmission substrate. All of the optical article constructions of Zyss exhibiting second order nonpolarization effects can be applied to the practice of this invention and are here incorporated by reference.

An essential component of each of the optical articles of this invention is an optically active transmission medium which exhibits a second order polarization susceptibility $\chi^{(2)}$ greater than $10^{-9}$ (preferably greater than $10^{-8}$) electrostatic units. This high level of $\chi^{(2)}$ is achieved by providing a transmission medium comprised of a poled condensation polymer including in its backbone a plurality of molecular dipoles containing sulfonyl electron acceptor moieties and by relatively orienting the molecular dipoles to reinforce electron displacement along the polymer backbone.

Condensation polymers satisfying these requirements can be formed by the condensation of A-B monomers containing the molecular dipoles. It is generally understood that condensation polymers can be formed by the condensation of A-A monomers with B-B monomers or by the condensation of A-B monomers, where A and B represent functional groups capable of selectively reacting with each other in a condensation reaction. Unlike the condensation reactions of A-A monomers with B-B monomers, A-B monomers condense to form linear polymers in which each repeating unit is aligned in the polymer backbone in exactly the same way:

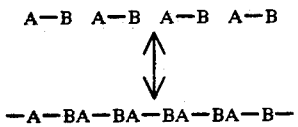

Since each A functional group selectively reacts with only a B functional group, there is no possibility of some molecular dipoles being incorporated in the polymer backbone in a reversed orientation, which would tend to diminish rather increase $\chi^{(2)}$. This can be more clearly seen by expanding the A-B monomer structure to show the orientation of the molecular dipole within the monomer and the resulting polymer:

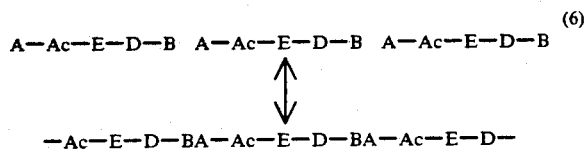

where
- A and B represent a pair of interactive functional groups capable of supporting a condensation polymerization reaction,
- BA is a divalent linking moiety created by the condensation reaction of A and B,
- Ac is an electron acceptor moiety,
- D is an electron donor moiety, and
- E is a conjugated $\pi$ bonding system.

In some forms of the invention no residue of the interactive functional groups A and B remains in the final polymer, and the polymer can be represented as follows:

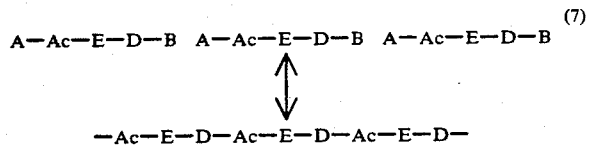

Note that in both linear condensation polymer structures electrons are being displaced from the electron donor moieties D through E to the electron acceptor moieties Ac in the same direction along the polymer backbone. The molecular dipoles are therefore reinforcing each other, and, since a reversed orientation of any one of the molecular dipoles in the polymer backbone is not possible, there is no possibility for reversed orientations, as could result, for example, from starting with molecular dipoles in A-A and/or B-B monomers.

Thus, a significant feature of the present invention is the provision of linear condensation polymers incorporating in their backbone molecular dipoles having their electron donor and acceptor moieties relatively aligned to reinforce electron displacement. This sets the invention apart from a variety of techniques proposed in the art that either cannot predictably orient a molecular dipole in a polymer backbone, are susceptible to random misorientations, or are tedious and time-consuming to construct.

Referring to formulae 6 and 7 above, it is apparent that both the electron donor moieties D and the electron acceptor moieties Ac must be susceptible to functional group substitution. One major difficulty in the construction of optically active transmission media containing molecular dipoles has been the unavailability of efficient electron acceptor moieties that can be functionally substituted. For example, neither nitro nor cyano moieties, two of the most efficient electron acceptor moieties for molecular dipoles, can be functionally substituted.

By employing a sulfonyl group as an electron acceptor moiety the present invention provides an electron acceptor which is capable of functional substitution to satisfy the requirements of condensation polymerization and which is also a highly efficient electron acceptor. The molecular dipoles in both the linear condensation polymer and the monomers from which the polymers are formed are comprised of an electron acceptor sulfonyl moiety bonded to an electron donor moiety by a linking moiety providing a conjugated $\pi$ bonding system to permit oscillation of the molecular dipole between a lower polarity ground state and a higher polarity excited state. The molecular dipoles of the invention are represented by the oscillation (resonance) ground state and excited state extremes, since these lend themselves to representation by chemical formulae. These formula pairs are useful in bracketing the range of structural variance, even though it is recognized that in practice neither of the oscillation extremes may be actually fully realized. In accordance with accepted practice the molecular dipoles are for simplicity named based on their ground state. When compounds including a molecular dipole are represented by a single formula, the ground state formula is employed.

The linear condensation polymers employed in the practice of this invention include in the polymer backbone molecular dipoles containing sulfonyl ($-SO_2R-$) electron acceptor moieties. Thus, showing the excited state as well as the ground state and more explicity defining the electron acceptor moieties, the A-B monomers containing molecular dipoles of formulae 6 and 7 satisfying the requirements of this invention can be represented as follows:

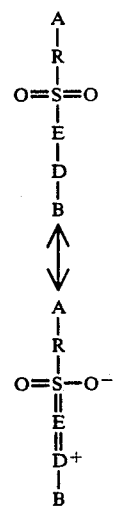

where
- A and B represent a pair of interactive functional groups capable of supporting a condensation polymerization reaction,
- D is an electron donor moiety,
- E is a conjugated $\pi$ bonding system, and R is an optionally substituted divalent hydrocarbon moiety.

The electron donor moieties can take any convenient conventional form. The electron donor moiety can be an amino moiety. Secondary and tertiary amino moieties are contemplated for use. The tertiary amino moiety produces the most highly polar excited state. When the electron donor moiety is an amino moiety, the molecular dipole monomers employed in the practice of the invention can be represented as follows:

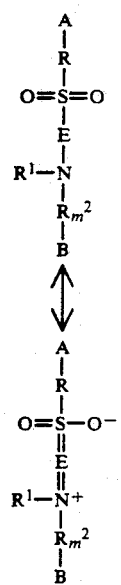

(9)

where

A, B, E, and R are as previously defined, $R^1$ is hydrogen or, preferably, an optionally substituted hydrocarbon moiety, $R^2$ is a separate hydrocarbon moiety, or $R^1$ and $R^2$ together complete a cyclic amino moiety, and m is 0 or 1.

Instead of employing an amino group as an electron donor moiety, it is specifically contemplated to employ an oxy or thio electron donor moiety. When such oxy and thio electron donor moieties are employed, the molecular dipole monomers can be represented as follows:

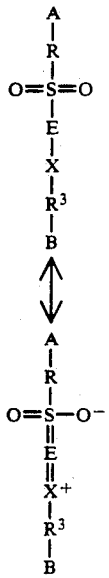

(10)

where

A, B, E, and R are as previously defined, $R^3$ is an optionally substituted hydrocarbon moiety, and X is oxygen or sulfur.

The moiety E linking the electron donor and sulfonyl electron acceptor moieties is selected to satisfy three fundamental characteristics. First, it is chosen so that the molecule will be noncentrosymmetric, thereby exhibiting a dipole moment even in its ground state. Second, it is chosen to provide sufficient spatial separation of the electron donor and acceptor moieties to provide a large dipole moment in the polar excited state of the electron donor and acceptor moieties. Third, the linking moiety is chosen to permit efficient oscillation or charge transfer resonance between the ground and excited states. This results in large differences between the excited state and ground state dipole moments.

A conjugated $\pi$ bonding system can satisfy all three requirements. On its most elemental level such a bonding system can be provided by chains of methine (a.k.a., methenyl and methylidyne) groups, which are (except as specifically noted) to be understood as including substituted forms. Such chains can optionally include one or more aza ($-N=$) moieties.

To satisfy the requirement for oscillation or charge transfer resonance, it is essential that the resonance path be defined by an even number of atoms. The number of atoms in the resonance path between the electron donor and acceptor is preferably at least 4 and optimally at least 8.

While increasing the number of atoms in the resonance path should increase the excited state dipole moment, it also tends toward nonplanar molecular conformations which lead to losses in hyperpolarizability density ($\beta/V$, where V is the transmission medium volume) as well as thermal and other energy losses (e.g., losses in transparency), so that at first diminishing gains and then overall losses result from increasing the number of atoms in the resonance path. It is generally preferred that the number of atoms in the resonance path between the electron donor and acceptor be 20 or less and optimally 14 or less.

Thus, in a more specific form, the molecular dipole monomers can be represented as follows:

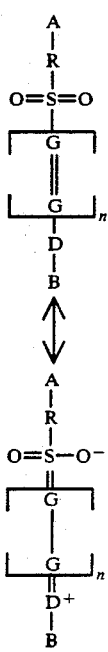

(11)

where
A, B, D, and R are as previously described;
G is independently in each occurrence methine or aza; and
n is 4 to 20, preferably 8 to 14.

For synthetic convenience it is generally preferred that no more than two adjacent G groups be aza groups. Thus, both individual aza (—N=) and diazo (—N=N—) groups are contemplated to be present in the linking moiety.

While the aza groups permit no substitution, the methine groups can be substituted, if desired. Preferred linking moieties are those which have been at least partially rigidized by substituents bridging methine groups in the resonance path. Rigidization of the linking moiety reduces energy dissipation. In a specifically preferred form of bridging substitution of the methine groups in the resonance path, the linking moiety is wholly or, preferably, partially aromatized. Both carbocyclic and heterocyclic aromatization is specifically contemplated.

A specifically preferred class of molecular dipoles satisfying the requirements of the invention are 4-sulfonyl-4'-D-stilbenes, where D is an electron donor moiety, such as an amino, oxy, or thio substituent, as previously defined. In these stilbenes the electron acceptor sulfonyl and electron donor moieties are each bonded to one terminal aromatized portion of the conjugated $\pi$ bonding linking moiety, with the aromatized portions of the linking moiety being joined by an ethylene (vinylene) group. When the single ethylene linking group of the stilbene is replaced by two or more ethylene groups, within the resonance path chain length limits noted above, highly advantageous analogues are realized. Substitution of individual methine groups with aza groups, particularly in the ethylenic portion of the linkage, are compatible with achieving high $\beta$ values. The ethylenically expanded and aza substituted stilbene variants are hereinafter referred to as stilbenoid compounds, since they are compounds which share significant property similarities with stilbenes.

In a preferred form of the invention, the stilbene and stilbenoid monomers can be represented as follows:

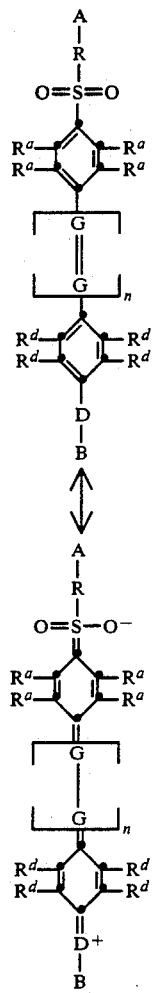

(12)

where
A, B, D, and R are as previously described;
G is independently in each occurrence a methine or aza moiety, with the proviso that no more than two aza moieties are next adjacent;
n is an integer of from 1 to 3;
$R^a$ represent hydrogen, substituents which together with the sulfonyl group $SO_2R$ collectively enhance the electron acceptance of the phenyl ring to which they are attached, or a combination of both; and
$R^d$ represent hydrogen, substituents which together with the electron donor D collectively enhance the electron donation of the phenyl ring to which they are attached, or a combination of both.

In another preferred form of the invention the terminal methine group attached to the electron acceptor sulfonyl, —$SO_2R$—, moiety is replaced by an aza (—N=) group. The sulfonyl and aza groups in combination form a sulfonimino, =N—$SO_2R$—, group. By including the aza portion of the sulfonimino group as part of the linking moiety E all the relationships previously discussed are applicable; however the sulfonimino group is incompatible with the stilbenoid structures of formula pair 12. One preferred class of dipolar compounds exhibiting high levels of hyperpolarizability incorporating a terminal sulfonimino group can be represented as follows:

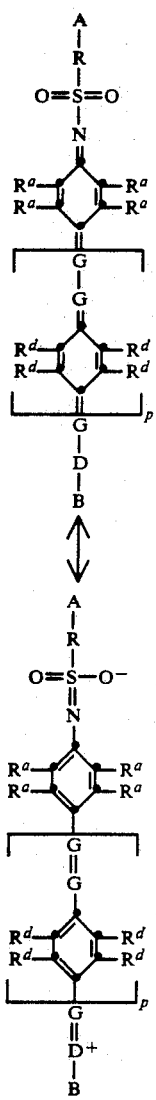

(13)

where
A, B, D, R, $R^a$, and $R^d$ are as previously defined;
G is independently in each occurrence a methine or aza moiety, with the proviso that no more than two aza moieties are next adjacent; and
p is 0 or 1.

In formula pair 13 neither of the two terminal resonance path atoms of the linking moiety are included in a rigidizing aromatic ring, but the rigidizing aromatic ring or rings are located next adjacent to each resonance path terminal atom of the linking moiety. Note that either 6 or 12 atoms are present in the resonance path provided by the linking moiety.

When electron donation is from a nitrogen atom, a terminal aromatic rigidizing ring system formed by a 4-pyridinium and 4-pyrido tautomer is possible, as illustrated by the preferred dipolar compounds of formula pair 14.

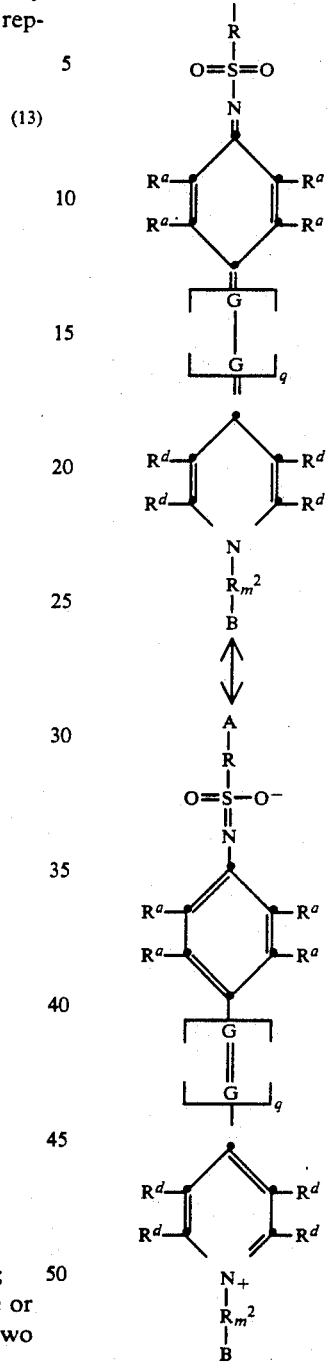

(14)

where
A, B, m, R, $R^2$, $R^a$, and $R^d$ are as previously defined;
G is independently in each occurrence a methine or aza moiety, with the proviso that no more than two aza moieties are next adjacent; and
q is an integer of from 0 to 3.

In specifically preferred forms of the compounds of formulae 12 to 14 inclusive the two aromatic rings are coplanar. To preserve the coplanarity of the rings it is preferred that, when the G groups of the formulae are methine groups, they remain unsubstituted. However, sterically compact methine substituents compatible with coplanarity, such as fluorine and lower alkyl groups of from about 1 to 3 carbon atoms, are contemplated.

For synthetic simplicity the aromatic rings can be left unsubstituted while achieving high levels of performance. It is appreciated, however, that the dipole moment can be increased by employing in available phenylene ring positions substituents which supplement the electronic asymmetry induced by the electron acceptor sulfonyl moiety and the electron donor moiety D. Electron donating and accepting properties of phenyl rings imparted by substitution have been extensively studied and quantified by the assignment of Hammett sigma values. Substituents which render phenyl rings electron accepting are assigned positive Hammett sigma values while negative Hammett sigma values are assigned to substituents which render phenyl rings electron donating. Hydrogen atoms attached to phenyl rings are assigned a Hammett sigma value of zero. By algebraically summing the Hammett sigma values of substituents to a phenyl ring it is possible to arrive at a net Hammett sigma value for the phenyl ring that is indicative of whether the substituted phenyl ring is electron accepting (indicated by a positive net Hammett sigma value) or electron donating (indicated by a negative net Hammett sigma value). Further, the algebraic sum of the substituent Hammett sigma values quantifies the degree to which the substituted phenyl ring is electron accepting or donating.

Lange's Handbook of Chemistry, 12 Ed., McGraw-Hill, 1979, Table 3-12, pp. 3-135 to 3-138, here incorporated by reference, lists Hammett sigma values for a large number of commonly encountered substituents. Ortho and para position substituents usually exhibit identical Hammett sigma values, which differ to only a limited degree from meta sigma values and can, in any event, be determined from published lists. Exemplary simple substituents and their published meta Hammett sigma values are primary and second alkyl substituents, such as methyl $\sigma=-0.07$, ethyl $\sigma=-0.07$, n-propyl $\sigma=-0.05$, i-propyl $\sigma=-0.07$, n-butyl $\sigma=-0.07$, and sec-butyl $\sigma=-0.07$. These alkyl substituents are synthetically convenient and therefore contemplated. Alkyl substituents containing tertiary carbon atoms and particularly tertiary alkyl groups tend to be even more highly electron donating. Aryl groups such as phenyl, $\alpha$-naphthyl, and $\beta$-naphthyl groups are contemplated (e.g., phenyl $\sigma=+0.06$). Other useful and specifically contemplated hydrocarbon substituents include alkaryl substituents (e.g., p-methylphenyl), aralkyl substituents (e.g., benzyl $\sigma=-0.05$ and phenethyl), alkenyl substituents (e.g. vinyl $\sigma=+0.02$), aralkenyl substituents (e.g., 2-phenylvinyl $\sigma=+0.14$), alkynyl substituents (e.g., ethynyl $\sigma=+0.21$, propargyl, and 2-butynyl), and aralkynyl substituents (e.g., phenethynyl $\sigma=+0.14$). Substituted hydrocarbon substituents are also contemplated, such as haloalkyl substituents (e.g., bromomethyl, chloromethyl $\sigma=-0.12$, fluoromethyl, and iodomethyl), haloaryl substituents (e.g., p-bromophenyl, m-bromophenyl, and p-chlorophenyl, and hydroxyalkyl substituents (e.g., hydroxymethyl $\sigma=+0.08$). While a broad range of substituents are possible, substituents which will compete with either A or B in the condensation reaction are to be avoided.

It is specifically preferred to select $R^a$ substituents independently from among known phenyl ring substituents having a positive Hammett sigma value and to select $R^d$ substituents independently from among known phenyl ring substituents having a negative Hammett sigma value. However, it is recognized that combinations of $R^a$ substituents are possible, some of which are electron donating, some of which are essentially neutral, and some of which are electron accepting. Combinations of $R^a$ substituents are possible which, together with the sulfonyl, —SO$_2$R—, algebraically sum to a positive net Hammett sigma value. Preferably the combination of $R^a$ substituents, without inclusion of the sulfonyl group, provide a positive net Hammett sigma value. Similarly, any combination of $R^d$ substituents is possible which, together with the electron donor, D, algebraically sum to a negative net Hammett sigma value. Preferably the combination of $R^d$ substituents, without inclusion of the substituent D, provide a negative net Hammett sigma value.

To avoid perturbation of the desired resonance pattern no one $R^a$ substituent should have a Hammett sigma value more positive than that of the sulfonyl electron acceptor moiety, and no one $R^d$ substituent should have a Hammett sigma value more negative than that of the electron donor moiety D. It is also important to bear in mind that large $\beta$ values depend not only on achieving a large dipole moment, but also on achieving a large difference between the excited state and ground state dipole moments. Thus substituents must be chosen from among those which are compatible with reversible charge transfer—i.e., charge transfer resonance. Thus substituents of the very highest and lowest Hammett sigma values are preferably avoided.

It is recognized that two adjacent $R^a$ or $R^d$ substituents can, if desired, together form a ring fused with the phenyl ring to which they are attached. Fused benzo rings are specifically contemplated. Polycyclic aromatic rings, such as naphthyl and anthracyl aromatic rings, in the linking moieties are therefore possible. Fused benzo rings are compatible with the coplanarity of the aromatic nuclei and, unless they are themselves substituted, have little effect on electronic asymmetry. It is further recognized that $R^1$, $R^2$, and $R^3$ can, if desired, form with an $R^d$ substituent ortho to D a fused ring, preferably of 5 or 6 member ring. However, while within the contemplation of useful dipole molecular structures, fused ring substituent patterns are not generally preferred, since they increase molecular bulk, thereby reducing the hyperpolarizability density $\beta/V$ (defined above), while lacking in many instances the synthetic convenience of monovalent substituents.

In their preferred forms R, $R^1$, $R^2$, and $R^3$ are hydrocarbon substituents. Specifically contemplated are all aliphatic hydrocarbon substituents containing from 1 to about 40 carbon atoms—e.g., alkyl, alkenyl, and alkynyl, including all cyclic forms thereof; all aromatic hydrocarbon substituents containing from 6 to 20 carbon atoms (preferably 6 to 10 carbon atoms—i.e., phenyl and naphthyl); and hydrocarbon substituents which are composites of these aliphatic and aromatic substituents—e.g., alkaryl, aralkyl, alkaralkyl, aralkaryl, etc. To avoid increasing molecular bulk it is preferred that the hydrocarbon substituents contain no more than 12 carbon atoms, optimally no more than 7 carbon atoms. The aliphatic substituents and substituent moieties can contain unsaturation for steric or synthetic convenience.

The hydrocarbon substituent R is substituted with functional group A while the hydrocarbon substituents $R^2$ and $R^3$ are substituted with functional group B. Other, optional substituents of all the hydrocarbon substituents which do not compete in the condensation reaction are, of course, possible. The hydrocarbon and substituted hydrocarbon substituents of the electron acceptor and donor moieties can be chosen, if desired, to enhance the electron accepting or donating functions of the electron acceptor and donor moieties, respectively. Hammett sigma values of the electron donor and electron acceptor moieties are useful for this purpose, as explained above in connection with the selection of $R^a$ and $R^d$ substituents.

The molecular dipole monomers can include any interactive pair of functional groups A and B known to be capable of supporting a condensation polymerization reaction. One preferred class of condensation polymers compatible with the A-B molecular dipole monomer requirements of this invention are polyesters. Referring to formulae 5 and 6 above, in this form of the invention the divalent linking moiety —BA— created by the condensation reaction of A and B can be either —O—C(O)— or —C(O)—O—. To produce polyester linkages of the molecular dipoles either A or B can be an —OH group or its reactive equivalent while the other is a carboxy group —C(O)—OH or its reactive equivalent. When carboxy and hydroxy groups are reacted, water is eliminated and the ester linkage is produced as part of the polymer backbone. A common alternative polyester reaction is to employ a carbonyl halide (e.g., —C(O)Cl) reactive group instead of the carboxy group. The reaction results in polyester formation via dehydrohalogenation.

Another alternative polyester reaction is to employ an ester and an alcohol having a lower vapor pressure than the alcohol moiety of the ester, so that on heating polyesterification occurs, eliminating an alcohol having a higher vapor pressure than that of the initially present alcohol reactant.

It is also possible to form a polyester by substituting for the hydroxy interactive functional group forming A or B an ester group —O—C(O)—$R^4$, where $R^4$ is any convenient optionally substituted hydrocarbon. $R^4$ can be selected from among the same types of hydrocarbons described above in connection with R, $R^2$, or $R^3$, but a somewhat broader range of choices is possible, since $R^4$ forms no part of the final polyester molecular dipole. For example, when A is —C(O)OH and B is —O—C(O)—$R^4$, the carboxylic acid HO—C(O)—$R^4$ is eliminated.

A second preferred class of condensation polymers compatible with the A-B molecular dipole monomer requirements of this invention are polyamides. One of the two interactive functional groups A and B can be a carboxy, carbonyl halide, or equivalent group of the type described above as useful in forming a polyester. The remaining interactive functional group is a primary or secondary amine—i.e., —$NH_2$ or —$NHR^5$, where $R^5$ is any convenient optionally substituted hydrocarbon. The optionally substituted hydrocarbon can be selected employing the criteria set forth above for the selection of R, $R^1$, $R^2$, and $R^3$. When $R^5$ is a hydrocarbon substituent it preferably contains from 1 to 12 carbon atoms, optimally form 1 to 6 carbon atoms. To reduce molecular bulk and facilitate the condensation reaction primary amino groups are the preferred interactive amino functional groups in forming polyamide condensation polymers satisfying the requirements of the invention.

Polyester and polyamide condensation polymers are the preferred embodiments of the invention, since the condensation reactions occur under milder reactive conditions than are generally required for the formation of other condensation polymers, allowing the greatest freedom of molecular dipole selection and particularly molecular dipole substitution.

In another contemplated form the condensation polymer can be a polyurethane. In this form of the invention one of the interactive functional groups A and B is an isocyanate —NCO group while the remaining interactive functional group is a hydroxy —OH group. This results in the formation of a divalent linking group BA —O—C(O)—NH— or —NH—C(O)—O—.

In still another form of the invention the condensation polymer can be a polyamine. In this form of the invention one of the interactive functional groups A and B can be a halogen, such as a chloro substituent, while the other reactive group can be the hydrogen of a secondary amino group. Dehydrohalogenation results in forming the polyamine as a condensation product. In this form of the invention A and B are both entirely eliminated by the condensation reaction. These polyamines are illustrative of the type of condensation polymers satisfying the invention described above in connection with formula 7. A molecular dipole monomer is represented by formula 9 above, wherein A is halogen (e.g., chloro), B is hydrogen, $R^1$ is hydrogen or an optionally substituted hydrocarbon, and m is zero. It is also possible to form a polyamine by first forming a polyamide as described above followed by reduction of the amido moieties to the corresponding amino moieties.

In the foregoing description the molecular dipole monomers are formed with the interactive functional group A being a substituent of the electron acceptor moiety of the molecular dipole and the interactive function group B being a substituent of the electron donor moiety of the molecular dipole. While this arrangement of interactive functional groups is synthetically convenient, it is not essential. When the interactive functional groups are entirely eliminated by condensation, such as in the formation of polyamines of the type described above, the following monomer arrangement is possible:

(15)

where
A is a halogen substituent,
B is an active hydrogen, and
E, R and $R^1$ can take any of the various forms previously described.

Upon condensation by dehydrohalogenation, the following polyamine molecular dipole repeating units are formed:

(16)

As a specific illustration, where R is trimethylene —$(CH_2)_3$— and $R^1$ is methyl, the polyamine polymer can be synthesized by reacting 1-mercapto-4-chlorobenzene as a starting material with $Cl(CH_2)_2C(O)NHCH_3$ in the presence of $NaOC_2H_3$ to produce a sulfide by elimination of the mercapto hydrogen and the amide chloro substituent. The sulfide can then be oxidized to the corresponding sulfonyl compound by any convenient technique (e.g., treatment with hydrogen peroxide and acetic acid). Further treatment of the sulfonyl compound with borohydride in an organic solvent, such as tetrahydrofuran, reduces the amido carbonyl to a methylene (—$CH_2$—) group, completing formation of the monomer. Condensation polymerization to form the polyamine with uniformly oriented backbone molecular dipoles can be undertaken by heating in the presence of potassium carbonate. From the above synthetic description numerous variations will readily occur to those versed in condensation polymerization techniques.

The following are illustrative of A-B molecular dipole monomers suitable for producing aligned repeating unit condensation polymer satisfying the requirements of the invention:

TABLE I

| | |
|---|---|
| M-1 | 4'-{N-[5-(Methoxycarbonyl)pentyl]-N-methylamino}-4-(6-hydroxyhexyl)sulfonylazobenzene |
| M-2 | 4'-{N-[5-(Butoxycarbonyl)pentyl]-N-methylamino}-4-(6-hydroxyhexyl)sulfonylazobenzene |
| M-3 | 4'-{N-[5-(Methoxycarbonyl)pentyl]-N-methylamino}-4-(6-hydroxyhexyl)sulfonylstilbene |
| M-4 | 4'-{N-[5-(Butoxycarbonyl)pentyl]-N-methylamino}-4-(6-hydroxyhexyl)sulfonylstilbene |
| M-5 | 4'-[N-(Methoxycarbonyl)methyl-N-methylamino]-4-(6-hydroxyhexyl)sulfonylazobenzene |
| M-6 | 4'-[N-(Ethoxycarbonyl)methyl-N-methylamino]-4-(6-hydroxyhexyl)sulfonylazobenzene |
| M-7 | 4'-[N-(Methoxycarbonyl)methyl-N-methylamino]-4-(6-hydroxyhexyl)sulfonylstilbene |
| M-8 | 4'-[N-(Ethoxycarbonyl)methyl-N-methylamino]-4-(6-hydroxyhexyl)sulfonylstilbene |
| M-9 | 4'-[N-(6-Hydroxyhexyl)-N-methylamino]-4-[2-(methoxycarbonyl)ethyl]sulfonylazobenzene |
| M-10 | 4'-[N-(6-Hydroxyhexyl)-N-methylamino]-4-[2-(ethoxycarbonyl)ethyl]sulfonylazobenzene |
| M-11 | 4'-[N-(6-Hydroxyhexyl)-N-methylamino]-4-[2-(methoxycarbonyl)ethyl]sulfonylstilbene |
| M-12 | 4'-[N-(6-Hydroxyhexyl)-N-methylamino]-4-[2-(ethoxycarbonyl)ethyl]sulfonylstilbene |
| M-13 | 4'-[N-(2-Hydroxyethyl)-N-methylamino]-4-[2-(methoxycarbonyl)ethyl]sulfonylazobenzene |
| M-14 | 4'-[N-(2-Hydroxyethyl)-N-methylamino]-4-[2-(ethoxycarbonyl)ethyl]sulfonylazobenzene |
| M-15 | 4'-[N-(2-Hydroxyethyl)-N-methylamino]-4-[2-(methoxycarbonyl)ethyl]sulfonylstilbene |
| M-16 | 4'-[N-(2-Hydroxyethyl)-N-methylamino]-4-[2-(ethoxycarbonyl)ethyl]sulfonylstilbene |
| M-17 | 4'-[N-(2-Hydroxyhexyl)-N-methylamino]-4-[5-(methoxycarbonyl)pentyl]sulfonylazobenzene |
| M-18 | 4'-[N-(2-Hydroxyhexyl)-N-methylamino]-4-[5-(methoxycarbonyl)pentyl]sulfonylstilbene |
| M-19 | 4'-(4-Hydroxy-1-piperidinyl)-4-[2-(methoxycarbonyl)ethyl] sulfonylazobenzene |
| M-20 | 4'-(4-Hydroxy-1-piperidinyl)-4-[2-(methoxycarbonyl)ethyl]sulfonylstilbene |

The second order polarization susceptibility $\chi^{(2)}$ of the optically active transmission medium containing aligned (poled) condensation polymers satisfying the requirements of this invention is increased as compared to monomeric molecular dipoles or polymers containing molecular dipoles as pendant groups by the square root of the number of aligned molecular dipole repeating units in the backbone of the polymer. Thus, there is no theoretical limit on the number of repeating molecular dipole units which can be incorporated in the polymer backbone. Each additional repeating unit will incrementally increase $\chi^{(2)}$, assuming that the polymer backbones can be aligned in the optically active medium.

In practice it is preferred to choose the number of molecular dipoles in the linear polymer backbone so that the polymer can be aligned (poled) by the application of an electric field while the polymer is in a heated fluid state and then locked in its aligned (poled) position by cooling to ambient temperatures with the electric field applied. A typical technique is to pattern (e.g., spin cast or otherwise suitably shape) the polymer in a fluid state to form an optically active transmission medium of the desired geometrical configuration.

When this approach to molecular dipole alignment is considered, it is apparent that the glass transition ($T_g$) temperature of the polymer should be well above ambient temperatures to avoid relaxation of poling when the externally supplied electric field is removed. The polymers contemplated for use in the practice of this invention are those which contain sufficient repeating units to exhibit a $T_g$ of greater than 50° C., preferably greater than 100° C. However, the glass transition temperature of the polymer must be lower than the decomposition temperature of the polymer, preferably no greater than 200° C.

A practical limit on the number of repeating units that can be contained in the polymers to be poled can be related to the time of response to poling. As the molecular weight of the polymer (a function of both the number of repeating units and their bulk) increases the duration of poling increases exponentially.

The foregoing considerations suggest that between simple dimers and extremely long chain length linear polymers there is a range of polymer molecular weights and numbers of molecular dipole repeating units that are particularly well suited for the purposes of the present invention. The preferred polymers satisfying requirements of this invention contain from 10 to 250, optimally from 25 to 120, repeating units. The preferred linear polymers have molecular weights (weight average) in the range of from about 4,000 to 100,000, optimally 10,000 to 50,000. Polymer molecular weights, unless otherwise indicated are understood to be measured by gel permeation chromatography (GPC) using differential refractive index differential and polystyrene standards. A molecular weight determination procedure of this type is described in detail in "Modern Size Exclusion Chromatography", W. W. Yau, J. J. Kirkland, and D. D. Bly, Wiley Interscience, J. Wiley and Sons, 1979.

The advantage of forming the optically active medium by poling as described above is that the medium can consist entirely of the linear polymers satisfying the requirements of the invention, if desired. In this instance there no possibility of $\chi^{(2)}$ reduction attributable to a diluting influence of other ingredients. Further, there is no possibility of nonuniformities attribution to incomplete mixing or partial phase separations occurring on heating and cooling, as can occur in a multicomponent composition. Additionally, by relying on a $T_g$ well above ambient to hold the polymers in their aligned arrangement there is no need to complicate the polymers with crosslinking sites that have the potential for degrading $\chi^{(2)}$.

Notwithstanding the advantages of preparing an optically active medium consisting essentially of a linear condensation polymer as described above, it is recognized that improvements over the existing state of the art are readily achieved by employing alternative techniques to align the linear condensation polymer in the medium. For example, the linear condensation polymer can be blended with a transparent binder which can be relied upon to hold the polymer in its poled alignment. In this instance the $T_g$ of the linear condensation polymer can be well below ambient temperature, if desired. The techniques of Singer et al and Scozzafava et al, cited above, are illustrative of this approach. In one specifically contemplated form the binder can be a photopolymerizable or photocrosslinkable material.

The specific selection of materials forming the optically active transmission media will be influenced by the wavelengths of electromagnetic radiation the transmission be used to propagate. The preferred optical articles of this invention are those which exhibit the lowest possible absorptions of electromagnetic radiation in the optically active transmission medium. For optical articles which are intended to propagate a single wavelength or range of wavelengths of electromagnetic radiation, transmission media are employed which exhibit absorption minima within the wavelength region of propagation. Where the optical article itself receives electromagnetic radiation of one wavelength and internally produces for transmission electromagnetic radiation of a differing wavelength, the transmission medium is preferably chosen to exhibit minimal absorptions in both spectral regions. For example, if it is intended to employ an optical article according to this invention for second harmonic generation in response to infrared radiation received from a laser, such as a laser emitting in the 800 to 1600 nm region of the spectrum, the linear polymers are chosen to exhibit the lowest levels of absorption possible at the laser wavelength in the infrared and at the wavelength of the second harmonic in the visible spectrum.

The optically active medium is most conveniently fabricated in the form of a coating on a substrate. In this form its thickness can range from the minimum thickness compatible with achieving a defect free layer, typically at least about 10,000 Å, up to any desired maximum. Optically active medium thicknesses ranging up to 100 μm or more are typical, with preferred thicknesses being in the range from about 1 to 10 μm.

EXAMPLES

The following are illustrative of specific embodiments of the invention.

EXAMPLE 1

Butyl-6-bromohexanoate

To an ice-cooled, stirred solution of 39 g (0.52 mol) of butanol and 42 g (0.52 mol) of pyridine in 550 mL of ether was added dropwise 100 g (0.47 mol) of 6-bromohexanoylchloride. The reaction mixture was stirred for 1 hour and then filtered. The filtrate was washed with water, 5% NaHCO$_3$, and again with water. The organic layer was dried (MgSO$_4$), the solvent was removed by rotary evaporation, and the residue was distilled at reduced pressure, bp 120°-125° C. (0.1 mm). A colorless oil was obtained, mass 111 g (94%).

EXAMPLE 2

Butyl 6-(N-methyl-N-phenylamino)hexanoate

A mixture of 111 g (0.44 mol) of butyl-6-bromohexanoate (Example 21), 50 g (0.46 mol) of N-methylaniline, 63.9 g (0.46 mol) of anhydrous potassium carbonate, 3.6 g (0.022 mol) of potassium iodide, and 500 mL of butanol was heated at reflux with stirring for 60 hours. The resulting suspension was cooled and filtered, and the solid was extracted with ethyl acetate. The extract was combined with the filtrate and the solvents were removed by rotary evaporation. The residue was distilled in vacuo, bp 183°-188° C. (0.1 mm). A slightly yellow oil was obtained, mass 60 g (50%).

$^1$H NMR (300 MHz, CDCl$_3$) δ0.95 (t, 3H), 1.4 (m, 4H), 1.6 (m, 6H), 2.32 (t, 2H), 2.93 (s, 3H), 3.31 (t, 2H), 4.08 (t, 2H), 6.71 (m, 3H), 7.24 (m, 2H).

EXAMPLE 3

(4-Aminophenyl)-(6-hydroxyhexyl)sulfide

Sodium metal (24 g, 1.05 mol) was added cautiously, in small portions, to 1 liter of stirred absolute ethanol under nitrogen. When the sodium has dissolved, 125 g (1.0 mol) of 4-aminothiophenol was added slowly. 6-Chlorohexanol (143 g, 1.05 mol) was added in small portions, and the resulting mixture was heated at reflux with stirring for one hour. The reaction mixture was cooled, filtered, and the ethanol was evaporated at reduced pressure. The residue was taken up in dichloromethane, and the solution was washed with water, with 5% NaHCO$_3$ and again with water. The organic layer was dried (Na$_2$SO$_4$), concentrated, and the solid residue was recrystallized from ethanol. A pale yellow solid was obtained, mass 156 g.

EXAMPLE 4

(4-Acetamidophenyl)-(6-acetoxyhexyl)-sulfide

A mixture of 155 g (0.70 mol) of (4-aminophenyl)-(6-hydroxyhexyl)sulfide (Example 3), 140 g (1.75 mol) of pyridine, and 175 g (1.75 mol) of acetic anhydride was heated at reflux for 2 hours and then cooled. The reaction mixture was poured onto ice and the precipitated product was collected by filtration. After washing with water, 5% HCl, and again with water, the solid was air dried. After recrystallization from methanol, 155 g (71%) of a tan solid was obtained.

$^1$H NMR (300 MHz, CDCl$_3$) δ1.4 (m, 4H), 1.6 (m, 4H), 2.04 (s, 3H), 2.17 (s, 3H), 2.86 (t, 2H), 4.04 (t, 2H), 7.3 (m, 3H), 7.42 (d, 2H).

EXAMPLE 5

(4-Aminophenyl)-(6-hydroxyhexyl)sulfone

A mixture of 145 g (0.47 mol) of (4-acetamidophenyl)-(6-acetoxyhexyl)sulfide and 600 mL of glacial acetic acid was heated at reflux with stirring, and 140 g (1.2 mol) of 30% hydrogen peroxide was added in small portions over 3 hours. The reaction mixture was poured on ice, and an oil separated. The mixture was extracted with dichloromethane and the extract was washed with water. The organic layer was dried (MgSO$_4$) and the solvent was removed at reduced pressure to leave a tan oil. The oil was dissolved in a mixture of 100 g of sodium hydroxide, 260 mL of ethanol, and 140 mL of water, and refluxed with stirring for 16 hours. The product was extracted with ethyl ether and the extract was dried (MgSO$_4$) and concentrated. A waxy solid was obtained which was recrystallized from 60% ethanol/40% water at −20° C. to provide 74 g (61%) of a tan solid.

$^1$H NMR (300 MHz, (CD$_3$)$_2$SO) δ1.2 (m, 6H), 1.4 (m, 2H), 3.03 (t, 2H), 3.33 (t, 2H), 4.28 (t, 1H), 6.08 (s, 2H), 6.61 (d, 2H), 7.42 (d, 2H).

EXAMPLE 6

4'-{N-[5-(Butoxycarbonyl)pentyl]-N-methylamino}-4-(6-hydroxyhexyl)sulfonylazobenzene A stirred suspension of (4-aminophenyl)-(6-hydroxyhexyl)sulfone (Example 5, 7.2 g, 28 mmol) in 60 mL of 10% HCl was cooled to 0° C. and treated dropwise with 2.1 g (31 mmol) of sodium nitrite in 10 mL of water. The reaction mixture was stirred for 15 minutes and 7.8 g (28 mmol) of butyl N-methyl-N-phenyl-6-aminohexanoate (Example 2) was added slowly. The resulting mixture was gradually warmed to 23° C. and then stirred for 16 hours. The precipitated solid was filtered, washed with water, and air dried. The product was purified by flash chromatography on silica gel, eluting with 20% (v/v) ethyl ether/80% dichloromethane. The eluate was concentrated at reduced pressure and the residue was recrystallized from toluene/heptane to yield 8.1 g (53%) of an orange powder.

$^1$H NMR (300 MHz, CDCl$_3$) δ0.93 (t, 3H), 1.3–1.8 (m, 19H), 2.32 (t, 2H), 308 (s, 3H), 3.10 (t, 2H), 3.44 (t, 2H), 3.60 (t, 2H), 4.07 (t, 2H), 6.72 (d, 2H), 7.88 (d, 2H), 7.96 (AB, 4H). $^{13}$C{$^1$H} NMR (75.5 MHz, CDCl$_3$) δ13.7, 19.2, 22.7, 24.8, 25.2, 26.6, 26.8, 28.1, 30.7, 32.3, 34.1, 38.7, 52.5, 56.4, 62.5, 64.3, 111.3, 122.7, 126.0, 129.1, 138.4, 143.5, 152.3, 156.4, 173.6.

EXAMPLE 7

Polymerization of 4'-{N-[5-(Butoxycarbonyl)pentyl]-N-methylamino}-4-(6-hydroxyhexyl)sulfonylazobenzene A 4.8 g sample of 4'-[(butyl 6-hexanoyl)-methylamino]-4-(6-hydroxyhexyl)sulfonylazobenzene (Example 6) was heated to 155° C. under vacuum (10$^{-3}$ mm) for 5 hours with continuous mechanical stirring. The sample was cooled and 4 drops of dibutyl tin diacetate was added. The stirred mixture was heated under vacuum (10$^{-3}$ mm) to 155° C. for 16 hours and then at 175° C. for 5 hours. The product was cooled, dissolved in dichloromethane, and precipitated into 500 mL of methanol which was agitated in a blender. The red solid was filtered, washed with methanol, air dried, and then redissolved in dichloromethane. The precipitation into methanol was repeated, and the solid product was collected and washed with additional methanol. After drying at 80° C. in a vacuum oven, 3.8 g (91%) of a tough red solid was obtained.

GPC (CH$_2$Cl$_2$, polystyrene standards, differential refractive index detection): M$_n^-$=19900; M$_n^-$=70600. T$_g$=59° C. (DSC).

EXAMPLE 8

Ethyl N-methyl-N-phenylglycine

A mixture of N-methyl aniline (198 g, 1.85 mol), ethylchloroacetate (227 g, 1.85 mol), potassium carbonate (256 g, 1.85 mol), potassium iodide (15 g, 0.93 mol), and 750 mL of absolute ethanol was stirred at reflux for 72 hours, then cooled and filtered. The solvent was removed from the filtrate at reduced pressure, and the residue was fractionally distilled in vacuo. A slightly yellow oil was obtained.

Yield: 162 g (45%).

$^1$H NMR (300 MHz, CDCl$_3$) δ1.24 (t, J=7.1, 3H), 3.07 (s, 3H), 4.06 (s, 2H), 4.17 (q, J=7.1, 2H), 6.75 (m, 3H), 7.20 (m, 2H), IR (thin film) 1748, 1602, 1507, 1191 cm$^{-1}$.

EXAMPLE 9

Methyl 3-(4-acetamidophenylsulfonyl)-propionate

To a stirred solution of 23° C. of 4-acetamidobenzenesulfinic acid (57.8 g., 290 mmol), sodium hydroxide (11.6 g, 290 mmol), and sodium dihydrogen phosphate (40.0 g, 290 mmol) was added a solution of methyl acrylate (31.2 g, 362 mmol) in 50 mL of tetrahydrofuran. The reaction vessel was stirred at 23° C. for 18 hours, and the resulting white precipitate was filtered and washed with water. The product was air dried, then recrystallized from 2-butanone to produce 59.4 g (71%) of a white powder, mp 156°–158° C.

$^1$H NMR [300 MHz, (CD$_3$)$_2$SO] δ2.04 (s, 3H), 2.59 (t, 2H), 3.48 (t, 2H), 3.51 (s, 3H), 7.80 (AB, 4H), 10.4 (s, 1H). FD-MS: 285 m/e (M$^+$).

EXAMPLE 10

3-(4-Aminophenylsulfonyl)-1-propanol

A mixture of methyl 3-(4-acetamidophenylsulfonyl)-propionate (54.2 g, 190 mmol), sodium borohydride (22.3 g, 590 mmol), and 400 mL of t-butanol was stirred mechanically and heated to reflux. Methanol (11 mL) was added dropwise over 20 minutes, and the resulting solution was stirred at reflux for 2 hours. The reaction mixture was cooled, and 250 mL of 3M aqueous HCl was added slowly with vigorous gas evolution occurring. The resulting mixture was partially concentrated at reduced pressure to remove t-butanol, and the residue was heated at reflux for 2 hours. The mixture was cooled, and solid sodium bicarbonate was added slowly until the pH of the mixture was 6–7. The mixture was allowed to stand several hours at 23° C. and then the precipitated product was filtered. After recrystallization from methanol containing a small amount of ether, 8.2 g (20%) of cream-colored powder was obtained, mp 99°–102° C.

$^1$H NMR [300 MHz, (CD$_3$)$_2$SO] δ1.60 (m, 2H), 3.05 (m, 2H), 3.17 (m, 2H), 4.58 (t, 1H), 6.10 (br s, 2H), 6.61 (d, 2H), 7.42 (d, 2H).

EXAMPLE 11

4'-[N-(Ethoxycarbonyl)methyl]-N-methylamino]-4-[(3-hydroxypropyl)sulfonyl]-azobenzene A solution of 4.4 g (52 mmol) of sodium nitrite in 25 mL of water was added dropwise over 45 min to a vigorously stirred solution of 3-(4-aminophenylsulfonyl)-1-propanol (10.2 g, 47.4 mmol) cooled to −2° C. Anhydrous sodium acetate (8.4 g, 0.1 mol) was added, and the mixture was stirred to dissolve the solid. Ethyl N-methyl-N-phenylglycine (11.0 g, 56.9 mmol) was added, and the reaction mixture was allowed to warm slowly to room temperature. The resulting orange precipitate was filtered and washed with water, and then air dried. The product was twice recrystallized from toluene to produce 16.4 g (82%) of an orange powder, mp 129.5°–131° C.

$^1$H NMR (300 MHz, CDCl$_3$) δ1.27 (t, J=7.1, 3H), 1.82 (br s, 1H), 2.00 (m, 2H), 3.20 (s, 3H), 3.28 (t, J=7.6, 2H), 3.74 (t, J=5.9, 2H), 4.18 (s, 2H), 4.23 (q, J=7.1, 2H), 6.75 (d, J=9.1, 2H), 7.90 (d, J=9.1, 2H), 8.00 (AB, J=8.7, Δv=12.0, 4H). FD-MS: 419 m/e (M$^+$). Anal. Calcd for C$_{20}$H$_{25}$N$_3$O$_5$S: C, 57.26; H, 6.01; N, 10.02; S, 7.64. Found: C, 57.34; H, 5.75; N, 9.96; S, 7.55.

EXAMPLE 12

Polymerization of 4'-[N-(Ethoxycarbonyl)methyl-N-methylamino]-4-[(3-hydroxypropyl)sulfonyl]azobenzene A 4.2 g sample of the title monomer was placed in a polymerization bulb and heated to 155° C. at $2\times10^{-3}$ mm with stirring for 16 hours. The sample was cooled, 2 drops of dibutyltin diacetate was added and heated at 155° C. at $2\times10^{-3}$ mm with stirring for 4 hours. After cooling, the orange polymer was broken up, slurried with excess methanol, filtered, and dried in vacuo at 60° C.

EXAMPLE 13

Comparative Poling Stability

To compare the poling stability of polymers according to the invention containing molecular dipoles in the polymer backbone with polymers including molecular dipoles as pendant groups the orientational stability of a poled polymer according to Example 7 was compared with a pendant molecular dipole polymer of the type disclosed in U.S. Ser. No. 241,740, filed Sept. 8, 1988, now U.S. Pat. No. 4,900,127, Example 12, hereinafter referred to as Control Polymer 1. Control Polymer 1 and its synthesis are described in detail in PREPARATORY EXAMPLE 14.

The Example 7 was spin coated onto a indium tin oxide support, heated to a temperature 30° C. above its glass transition temperature and poled by applying an electrical field gradient of $10^6$ V/cm across the film. The decay time required for the polarization imparted by poling to be reduced by half was measured to provide an indication of the orientational stability of the polymer. At a temperature of 30° C. above the glass transition temperature a period of from about 100 to 140 minutes was required for polarization to decline to half its original value. The purpose of holding the coating above its glass transition temperature was to accelerate the rate of poling decline and thereby shorten the duration of the experiment. If the coating had been allowed to cool to a temperature below its glass transition temperature, much longer elapsed times would have been necessary to measure polarization decline.

Control Polymer 1 was similarly coated and poled, except that the coating was held at a temperature 20° C. below its glass transition temperature. If the orientational stabilities of the Example 7 and Control Polymer 1 samples were similar, the Control Polymer 1 coating should have retained its polarization for a much longer period than the Example 7 coating, since the Control Polymer 1 coating was maintained below its glass transition temperature. In fact, the Control Polymer 1 lost half of its polarization within about 30 minutes.

By comparing the times required for decay of polarization in the Example 7 and Control Polymer 1 coatings it is apparent that a significant increase in polarization stabilities were achieved by employing a polymer having molecular dipoles incorporated in the backbone of the polymer as opposed to attaching the molecular dipoles as pendant groups.

The invention has been described in detail with particular reference to preferred embodiments thereof, but it will be understood that variations and modifications can be effected within the spirit and scope of the invention.

PREPARATORY EXAMPLE 14

PREP.-EX. 1

4-Methylmercaptobenzyl chloride

To a stirred solution of 154 g (1.0 mol) of 4-methylmercaptobenzyl alcohol in 1 liter of dry benzene was added dropwise 80 mL (1.1 mol) of thionyl chloride. The mixture immediately turned blue. After the addition of the thionyl chloride was completed, the mixture was heated at reflux for 2 hours. After cooling, the benzene and excess thionyl chloride were distilled at ambient pressure. The product was distilled in vacuo at 105° C. (0.5 mm), to yield 160 g (93%) of a colorless liquid.

$^1$NMR (300 MHz, CDCl$_3$) δ2.49 (s, 3H), 4.57 (s, 2H), 7.28 (dd, 4H).

PREP.-EX 2

Diethyl 4-Methylmercaptobenzylphosphonate

4-Methylmercaptobenzyl chloride (App-Ex. 1, 160 g, 0.94 mol) was added dropwise, under nitrogen, with stirring to 183 g (1.1 mol) of triethylphosphite which was heated at reflux. When the addition of the 4-methylmercaptobenzyl chloride was completed, the mixture was refluxed for additional 4 hours. The product was distilled in vacuo to yield 229 g (89%) of a colorless, viscous oil bp 142°-145° C. (0.025 mm).

$^1$H NMR (300 MHz, CDCl$_3$, δ): 1.27 (t, 6H), 2.49 (s, 3H), 3.13 (d, 2H), 4.04 (quintet, 4H), 7.66 (dd, 4H).

PREP.-EX. 3

Diethyl 4-Methylsulfonylbenzylphosphonate

To a stirred solution of 174 g (0.60 mol) of diethyl 4-methylmercaptobenzylphosphonate (App-Ex. 2) in 500 mL of glacial acetic acid was added dropwise 171 g (1.5 mol) of hydrogen peroxide (30% in water). The mixture was heated at reflux for 2 hours. After cooling, the water and acetic acid were removed under reduced pressure and the residue was distilled to yield 121 g (66%) of very viscous liquid bp 214°-216° C. ($2\times10^{-4}$ mm).

$^1$H NMR (300 MHz, CDCl$_3$) δ1.23 (t, 6H), 3.01 (s, 3H), 3.19 (d, 2H), 4.02 (quintet, 4H), 7.66 (dd, 4H).

PREP.-EX. 4

4'-[(6-Hydroxyhexyl)amino]-4-methylsulfonylstilbene

To a solution of 5 g (0.125 mol) 60% sodium hydride dispersion, 27.7 g (0.1 mol) of 4-[(6-acetoxyhexyl)methylamino]benzaldehyde (Example 3) and 200 mL of dry, freshly distilled 1,2-dimethoxyethane (DME) under nitrogen, at room temperature, with vigorous stirring was added 30.6 g (0.1 mol) of diethyl 4-methylsulfonylbenzylphosphonate (App-Ex. 3). The mixture immediately turned yellow. The reaction mixture was heated at reflux for 2 hours. The bright yellow solution was poured over 400 g of crushed ice under a nitrogen blanket and the resulting mixture was extracted with four 250 mL portions of dichloromethane. The combined organic extracts were washed three times with 250 mL of water, and the solvent was removed at reduced pressure. The residue was dissolved in 250 mL of 10% (v/v) HCl in 1:1 ethanol:water and the solution was heated at reflux for 4 hours. After cooling the solution was neutralized to pH 7 by the slow and careful addition of sodium carbonate. The yellow solid thus formed was collected by filtration, washed with water and air dried. Recrystallization from methanol yielded 31.4 g (81%) of a bright yellow solid. This material contained some acetate which was not hydrolized (≈5%), however, a pure sample of the material was obtained by chromatography. Thus, 5 g of the material was dissolved in 25 mL of a mixture of acetone:ethylacetate 1:5, and loaded onto a dry silica gel column (500 g, 5 cm diameter). Elution gave 4.5 g of pure material which was then recrystallized from absolute methanol. mp 113°–115° C.

$^1$H NMR (300 MHz, CDCl$_3$) δ1.45 (m, 4H), 1.63 (m, 4H), 3.01 (s, 3H), 3.09 (s, 3H), 3.39 (t, 2H), 3.69 (br t, 2H), 6.67 (d, 2H), 6.89 (d, 1H), 7.18 (d, 1H), 7.41 (d, 2H), 7.60 (d, 2H), 7.87 (d, 2H).

PREP.-EX. 5

4'-[(6-acryloyloxyhexyl)methylamino]-4-methylsulfonylstilbene

A stirred mixture of 4'-[(6-hydroxyhexyl)methylamino]-4-methylsulfonylstilbene (App-Ex. 4, 20.0 g, 52 mmol), triethylamine (6.3 g, 62 mmol) and dry dichloromethane (DCM) was treated dropwise with acryloyl chloride (5.6 g, 62 mmol) in 50 mL of DCM at 23° C. under nitrogen. The resulting solution was stirred at 23° C. for 72 hours, and then filtered. The filtrate was washed successively with saturated NaCl, with saturated NHCO$_3$, and with water. The organic layer was dried (MgSO$_4$), and the solvent was removed at reduced pressure to deposit a yellow oil which gradually crystallized. The product was recrystallized from tetrahydrofuran (THF)/hexanes to yield 15.5 g (68%) of a yellow solid, mp 88°–90° C.

$^1$H NMR (300 MHz, CDCl$_3$) δ1.40 (m, 4H), 1.70 (m, 4H), 3.00 (s, 3H), 3.06 (s, 3H), 3.37 (t, 2H), 4.17 (t, 2H), 5.82 (dd, 1H), 6.12 (m, 1H), 6.40 (dd, 1H), 6.70 (d, 2H), 6.91 (d, 1H), 7.09 (d, 1H), 7.44 (d, 1H), 7.62 (d, 2H), 7.88 (d, 2H). $^{13}$C{$^1$H} NMR (75.5 MHz, CDCl$_3$) δ25.8, 26.7, 28.6, 44.6, 64.4, 121.4, 126.3, 127.2, 127.7, 128.3, 128.6, 129.5, 130.2, 130.4, 148.4. Anal. Calcd for C$_{25}$H$_{31}$N$_3$O$_4$S: C, 68.00; H, 7.08; N, 3.17; S, 7.26. Found: C, 68.01; H, 6.86; N, 2.98; S, 6.89.

PREP.-EX. 6

Copolymerization of 4'-[(6-acryloxyoxyhexyl)methylamino]-4-methylsulfonylstilbene with 4-t-butylstyrene A solution of 4'-[acryloxyoxyhexyl)methylamino]-4-methylsulfonylstilbene (Example 9, 5.00 g, 11.3 mmol), distilled 4-t-butylstyrene (15.0 g, 93.6 mmol), and AIBN (0.182 g, 1.1 mmol) in 100 mL of distilled chlorobenzene was degassed by standard freeze/thaw techniques and then was heated at 60° C. for 15 hours. The polymer was precipitated into 1500 mL of vigorously stirred methanol and purified by reprecipitation from dichloromethane into methanol. A yellow powder was obtained, mass 10.0 g (50%).

GPC (THF, polystyrene standards, differential refractive index detection): M$_n^-$ = 39500; M$_w^-$ = 166000. T$_g$ = 127° C. (DSC). T$_g$ 127° C.

What is claimed is:

1. An optical article containing, for the transmission of electromagnetic radiation, a medium exhibiting a second order polarization susceptibility greater than 10$^{-9}$ electrostatic units comprised of a linear polymer containing polar aligned noncentrosymmetric molecular dipoles each having an amino, oxy or thio electron donor moiety linked through a conjugated π bonding system to a sulfonyl electron acceptor moiety to permit oscillation of the molecular dipole between a ground state exhibiting a first dipole moment and an excited state exhibiting a differing dipole moment, characterized in that the linear polymer is a condensation polymer including in its backbone the electron donor moiety, the conjugated π bonding system, and the electron donor moiety of each of a plurality of the molecular dipoles and the molecular dipoles in the polymer backbone being relatively oriented to reinforce electron displacement along the polymer backbone.

2. An optical article according to claim 1 further characterized in that means are provided for directing electromagnetic radiation to said transmission medium.

3. An optical article according to claim 1 further characterized in that biasing means are provided for directing electromagnetic radiation across said transmission medium.

4. An optical article according to claim 3 further characterized in that said biasing means includes at least one transparent electrode in contact with said transmission medium.

5. An optical article according to claim 1 further characterized in that said transmission medium lies in contact with a linear waveguide for electromagnetic radiation.

6. An optical article according to claim 1 further characterized in that the molecular dipoles in the polymer backbone are oriented so that the sulfonyl electron acceptor and amino, oxy or thio electron donor moieties of each molecular dipole are relatively displaced in the same direction along the polymer backbone.

7. An optical article according to claim 1 further characterized in that the molecular dipoles containing sulfonyl electron acceptor moieties in the polymer backbone are derived from monomers satisfying the formula:

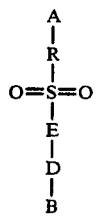

where

A and B represent a pair of interactive functional groups capable of supporting a condensation polymerization reaction, D is an amino, oxy or thio electron donor moiety, E is a conjugated π bonding system, and R is a divalent hydrocarbon moiety.

8. An optical article according to claim 1 further characterized in that the molecular dipoles containing sulfonyl electron acceptor moieties in the polymer backbone are derived from monomers satisfying the formula:

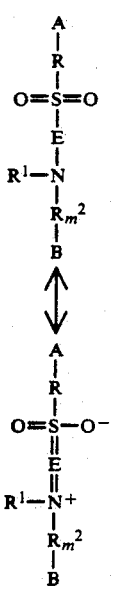

where
  A and B represent a pair of interactive functional groups capable of supporting a condensation polymerization reaction,
  E is a conjugated π bonding system,
  R is a divalent hydrocarbon moiety,
  R¹ is hydrogen or a hydrocarbon moiety,
  R² is a hydrocarbon moiety, or
  R¹ and R² together complete a cyclic amino moiety, and
  m is 0 or 1.

9. An optical article according to claim 1 further characterized in that the molecular dipoles containing sulfonyl electron acceptor moieties in the polymer backbone are derived from monomers satisfying the formula:

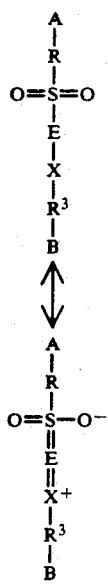

where
  A and B represent a pair of interactive functional groups capable of supporting a condensation polymerization reaction,
  E is a conjugated π bonding system,
  R is a divalent hydrocarbon moiety,
  R³ is a hydrocarbon moiety, and
  X is oxygen or sulfur.

10. An optical article according to claim 1 further characterized in that the molecular dipoles containing sulfonyl electron acceptor moieties in the polymer backbone are derived from monomers satisfying the formula:

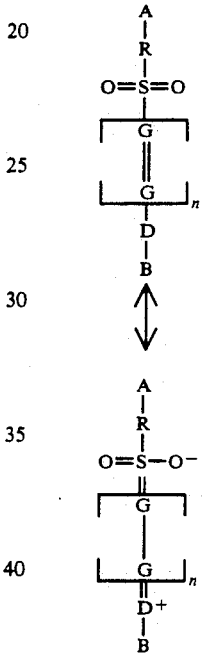

where
  A and B represent a pair of interactive functional groups capable of supporting a condensation polymerization reaction,
  D is an amino, oxy or thio electron donor moiety,
  G is independently in each occurrence methine or aza,
  n is 4 to 20, and
  R is a divalent hydrocarbon moiety.

11. An optical article according to claim 1 further characterized in that the molecular dipoles containing sulfonyl electron acceptor moieties in the polymer backbone are derived from monomers satisfying the formula:

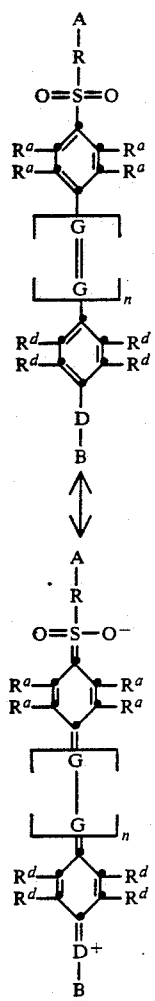

where
- A and B represent a pair of interactive functional groups capable of supporting a condensation polymerization reaction,
- D is an amino, oxy or thio electron donor moiety,
- G is independently in each occurrence a methine or aza moiety, with the proviso that no more than two aza moieties are next adjacent,
- n is an integer of from 1 to 3,
- R is a divalent hydrocarbon moiety,
- $R^a$ represent hydrogen or substituents no one of which have a Hammett sigma value more positive than the sulfonyl group $SO_2R$ and which together, without inclusion of the sulfonyl group $SO_2R$, provide a positive net Hammett sigma value, and
- $R^d$ represent hydrogen or substituents no one of which have a Hammett sigma value more negative than the electron donor D and which together, without inclusion of the electron donor D, provide a negative net Hammett sigma value.

12. An optical article according to claim 1 further characterized in that the molecular dipoles containing sulfonyl electron acceptor moieties in the polymer backbone are derived from monomers satisfying the formula:

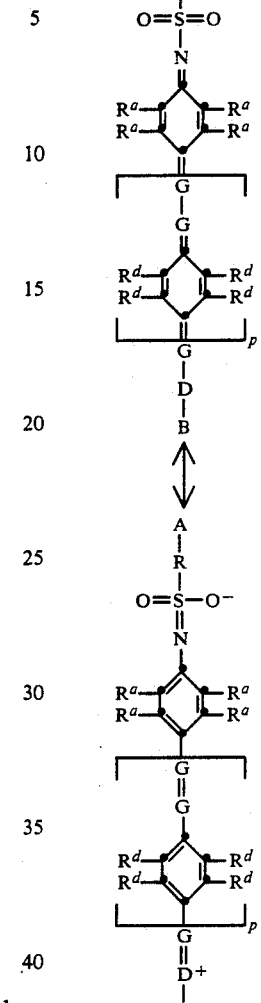

where
- A and B represent a pair of interactive functional groups capable of supporting a condensation polymerization reaction,
- D is an amino, oxy or thio electron donor moiety,
- G is independently in each occurrence a methine or aza moiety, with the proviso that no more than two aza moieties are next adjacent,
- p is 0 or 1,
- R is a divalent hydrocarbon moiety,
- $R^a$ represent hydrogen or substituents no one of which have a Hammett sigma value more positive than the sulfonyl group $SO_2R$ and which together, without inclusion of the sulfonyl group $SO_2R$, provide a positive net Hammett sigma value, and
- $R^d$ represent hydrogen or substituents no one of which have a Hammett sigma value more negative than the electron donor D and which together, without inclusion of the electron donor D, provide a negative net Hammett sigma value.

13. An optical article according to claim 1 further characterized in that the molecular dipoles containing sulfonyl electron acceptor moieties in the polymer backbone are derived from monomers satisfying the formula:

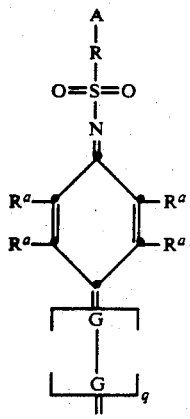

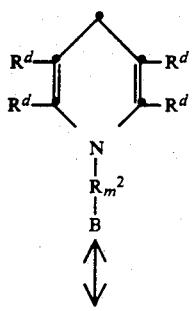

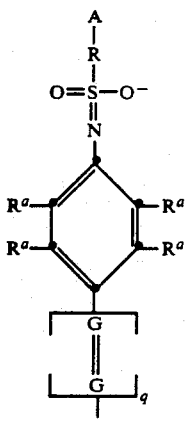

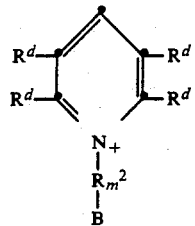

where
A and B represent a pair of interactive functional groups capable of supporting a condensation polymerization reaction,
G is independently in each occurrence a methine or aza moiety, with the proviso that no more than two aza moieties are next adjacent,
R is a divalent hydrocarbon moiety,
$R^a$ represent hydrogen or substituents no one of which have a Hammett sigma value more positive than the sulfonyl group $SO_2R$ and which together, without inclusion of the sulfonyl group $SO_2R$, provide a positive net Hammett sigma value,
$R^d$ represent hydrogen or substituents no one of which have a Hammett sigma value more negative than the electron donor D and which together, without inclusion of the electron donor D, provide a negative net Hammett sigma value, and
q is an integer of from 0 to 3.

14. An optical article according to claim 1 further characterized in that the molecular dipoles containing sulfonyl electron acceptor moieties in the polymer backbone are derived from monomers satisfying the formula:

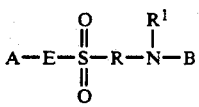

where
A is a halogen substituent,
B is an active hydrogen,
E is a conjugated $\pi$ bonding system,
R is a divalent hydrocarbon moiety, and
$R^1$ is a hydrocarbon moiety.

15. An optical article according to claim 1 further characterized in that the the linear polymer is a homopolymer.

16. An optical article according to claim 1 further characterized in that the conjugated $\pi$ bonding system is comprised of a stilbenoid moiety.

17. An optical article according to claim 16 further characterized in that the stilbenoid moiety is a divalent 4,4'-stilbene moiety.

* * * * *